(12) United States Patent
Craig et al.

(10) Patent No.: US 6,390,766 B1
(45) Date of Patent: May 21, 2002

(54) SHINGLE BUNDLE PALLETIZER WITH IMPROVED METERING CONVEYOR, PATTERN CONVEYOR AND SHUTTLE CONVEYOR

(75) Inventors: Robert P. Craig, Arlington; James R. Christophel, Flower Mound, both of TX (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/451,656

(22) Filed: Nov. 30, 1999

(51) Int. Cl.[7] ............................................. B65G 57/112

(52) U.S. Cl. .............................. 414/794.5; 414/794.6; 198/434

(58) Field of Search .................................. 198/434, 374, 198/835, 461.3, 817; 414/794.5, 794.6

(56) References Cited

U.S. PATENT DOCUMENTS

| | | |
|---|---|---|
| 945,870 A | 1/1910 | Scovill |
| 2,006,870 A | 7/1935 | Neuman |
| 3,195,710 A | 7/1965 | Robinson |
| 3,247,981 A | 4/1966 | Johnson |
| 3,476,271 A | 11/1969 | McWilliams |
| 3,499,551 A | 3/1970 | McWilliams |
| 3,507,411 A | 4/1970 | McWilliams |
| 3,517,925 A | 6/1970 | Hutz |
| 3,625,376 A | 12/1971 | McWilliams |
| 3,737,019 A | 6/1973 | Coleman et al. |
| 3,827,545 A | 8/1974 | Buhayar |
| 3,830,358 A | 8/1974 | Desantis |
| 3,964,598 A * | 6/1976 | Alsop ......................... 198/35 |
| 4,093,064 A | 6/1978 | Crane |
| 4,124,128 A * | 11/1978 | Adams et al. ........... 214/6 DK |
| 4,352,616 A | 10/1982 | Brenner |
| 4,384,813 A * | 5/1983 | Smith et al. ................. 414/31 |
| 4,443,995 A | 4/1984 | Myers et al. |
| 4,669,602 A | 6/1987 | Ouellette |
| 4,678,387 A | 7/1987 | Sjogren et al. |
| 4,682,684 A | 7/1987 | Lothman |
| 4,749,077 A | 6/1988 | Sjogren |
| 4,812,099 A | 3/1989 | Sjogren et al. |
| 4,934,517 A | 6/1990 | Lapeyre |
| 4,951,457 A | 8/1990 | Deal |
| 5,103,959 A | 4/1992 | Carlson |
| 5,127,513 A | 7/1992 | Huber |
| 5,145,049 A | 9/1992 | McClurkin |
| 5,178,255 A | 1/1993 | Carlson |
| 5,181,820 A | 1/1993 | Sjogren et al. |
| 5,188,211 A | 2/1993 | Ringot et al. |
| 5,215,184 A | 6/1993 | Huber |
| 5,226,780 A | 7/1993 | Sjogren et al. |

(List continued on next page.)

Primary Examiner—Christopher P. Ellis
Assistant Examiner—Rashmi Sharma
(74) Attorney, Agent, or Firm—Inger H. Eckert; James J. Dottavio (57) ABSTRACT

A shingle bundle palletizer includes a bundle metering conveyor, an incline conveyor, a pattern conveyor, a lug conveyor, an adjustable height transfer conveyor, a shuttle conveyor, and a pallet removal conveyor. The bundle metering conveyor includes one or more upstream and downstream belts. Each upstream belt is driven by an in-roller, variable speed motor that is independent of each downstream belt. The pattern conveyor includes a pair of outer pattern belts rotatably mounted on a pair of outer pulleys, and a center pattern belt rotatably mounted on a center pulley. The pair of outer pulleys is keyed to a pulley shaft and the center pulley is free-rotating about the pulley shaft to decouple the center pattern belt from the pair of outer belts. The pair of outer pattern belts and the center pattern belt are independently driven by separate motors and belts made of elastomeric material. The shuttle conveyor includes a belt made of an elastomeric material driven by a motor connected to a drive shaft. An encoder reads indicia on the drive shaft to determine the precise location of the shuttle conveyor during the reciprocation process.

14 Claims, 6 Drawing Sheets

U.S. PATENT DOCUMENTS

| | | |
|---|---|---|
| 5,267,638 A | 12/1993 | Doane |
| 5,316,123 A | 5/1994 | Achelpohl |
| 5,375,692 A | 12/1994 | Staudinger et al. |
| 5,419,677 A | 5/1995 | Cohn |
| 5,449,268 A | 9/1995 | Lingo et al. |
| 5,533,861 A | 7/1996 | Klupfel |
| 5,660,262 A | 8/1997 | Landrum et al. |
| 5,788,228 A | 8/1998 | Moll |

* cited by examiner

SHINGLE BUNDLE PALLETIZER WITH IMPROVED METERING CONVEYOR, PATTERN CONVEYOR AND SHUTTLE CONVEYOR

TECHNICAL FIELD AND INDUSTRIAL APPLICABILITY OF THE INVENTION

This invention relates to a conveyor, and in particular to a shingle bundle palletizer with an improved metering conveyor, pattern conveyor, and shuttle conveyor and a method of using the same.

BACKGROUND OF THE INVENTION

Typically, asphalt shingles are packaged into a bundle containing numerous shingles. For example, about twenty-seven asphalt shingles may be packaged into a bundle weighing about fifty pounds. After the shingles are packaged into bundles, the completed bundles enter a palletizer where the bundles are stacked onto pallets. The bundles enter the palletizer by travelling along a bundle metering conveyor, which assures that the bundles enter the palletizer at a fixed rate, such as, for example, about thirty-five bundles per minute.

There are well-known devices for metering articles on a conveyor system. For example, U.S. Pat. No. 4,443,995 to Myers et al. appears to disclose a metering device including a lower conveyor and an upper conveyor. The conveyors include a pair of transversely spaced chains. The conveyor and the conveyor belts have the same rate of forward movement. The articles that are supported by the sets of support bars will be maintained in position by the cooperating sets of carrier bars, respectively. A ramp may be used to elevate the articles supported by the bars onto a conveyor. The articles pass from the metering device to a packaging unit. The packaging unit includes a speed-up conveyor which has a linear speed greater than that of the conveyor and the conveyor chains. In another example, U.S. Pat. No. 4,682,684 to Lothman appears to disclose a pair of conveyors with conveyor belts. One conveyor belt rotates at twice the linear speed of the other conveyor belt such that an object is propelled along the first conveyor belt at twice the speed of the second conveyor belt.

After the bundles enter the palletizer at a fixed rate from the metering conveyer, a pattern conveyor then arranges the shingles by turning some of the bundles 90 degrees so that they will be in the appropriate pattern to be stacked onto the pallet. Typically, each layer of bundles on the pallet has the lengthwise direction of the bundles at a 90 degree angle to the bundles in the adjacent upper and lower layer.

Many conventional devices for arranging articles in a desired orientation on a conveyor system are known in the art. For example, U.S. Pat. No. 5,316,123 to Achelpohl appears to disclose an apparatus for arranging pieces in a flat position. The apparatus includes an upper conveyor belt that runs above a table, and a lower conveyor belt that runs below the table. The conveyor belts run at the same circumferential speed. A third, relatively short conveyor belt runs parallel to and at the same circumferential speed as the conveyor belts. As the workpiece moves along the conveyor belts, a clamping pin engages the workpiece to rotate the workpiece 90 degrees. Two stops on a pair of transfer belts running at the same circulating speed as the conveyor belts prevent any further rotation of the workpiece.

In another example, U.S. Pat. No. 5,660,262 to Landrum et al. appears to disclose an apparatus including variable speed motors for driving a chain, a drive element, and an infeed conveyor, respectively. The drive element is preferably a plurality of elastomeric O-ring belts which provide the composite feeding/turning action to successive cartons as they travel from the infeed conveyor to a take away conveyor. A microprocessor is used to control the stepper motors in order to maintain the desired position of the successive cartons.

After the bundles are arranged in the proper orientation on the conveyor system, a shuttle conveyor then receives a layer of bundles of shingles and, at the appropriate time, propels them onto the top of the stack of bundles on the pallet.

There exist some conventional devices for loading items from a shuttle mechanism onto a loading device. For example, U.S. Pat. Nos. 3,499,551, 3,507,411 and 3,625,376 to McWilliams appear to disclose an apparatus for loading mail bags from a loading dock into a loading vehicle. The apparatus includes an elevating mechanism and conveyor. The elevating mechanism comprises a pair of cross levers that are pivotally mounted to a platform and a wheeled frame. One of the levers can be drawn forward of the wheeled frame by a screw and nut device to raise the platform from a lowered position to an upper position.

In conventional devices, the shuttle is driven forward and rearward by a main air cylinder. Two cushioning air cylinders cushion the end of travel of the shuttle in the forward and rearward directions. The movement of the shuttle in the prior art shuttle conveyor design is somewhat imprecise because of the variability introduced by the air cylinders which operate differently under different temperature and humidity conditions. Also, lubrication variations in the moving parts can affect the preciseness of the motion.

There is a need to provide a improved bundle metering conveyor that includes an upstream belt mechanism which can supply the bundles at a first feed rate, and a downstream belt mechanism to take away the bundles at a second, faster bundle takeaway rate. In addition, there is a need to provide an improved pattern conveyor in which the speed of the belt rotation can be selected by use of a variable speed motor for driving one or more belts that can be decoupled from one another. Further, there exists a need for an improved shuttle conveyor with a drive mechanism which can precisely reciprocate the shuttle conveyor and control the exact location of shuttle conveyor.

SUMMARY OF THE INVENTION

The above objects as well as other objects not specifically enumerated are achieved by a bundle palletizer comprising a bundle metering conveyor for providing bundles at a desired rate, a pattern conveyor downstream of the bundle metering conveyor for orienting the bundles provided by the bundle metering conveyor in a desired orientation, and a shuttle conveyor downstream of the pattern conveyor for stacking the bundles from the pattern conveyor.

According to this invention, there is also provided a bundle metering conveyor comprising one or more upstream belts, a first motor for driving the one or more upstream belts, one or more downstream belts, and a second motor for driving the one or more downstream belts.

According to this invention, there is also provided a pattern conveyor comprising a pair of outer pattern belts rotatably mounted on a pair of outer pulleys, and a center pattern belt rotatably mounted on a center pulley. The outer pulleys are keyed to a pulley shaft, and the center pulley is free-rotating about the pulley shaft, thereby decoupling the center pattern belt from the pair of outer belts.

According to this invention, there is also provided a shuttle conveyor comprising a belt made of elastomeric material, a variable-speed servo motor connected to a drive shaft for driving the belt, and an encoder for reading indicia on the drive shaft, thereby enabling a determination of a rotational speed of the drive shaft and a position of the shuttle conveyor.

Various objects and advantages of this invention will become apparent to those skilled in the art from the following detailed description of the preferred embodiment, when read in light of the accompanying drawings.

DETAILED DESCRIPTION OF THE INVENTION

Figure 1:
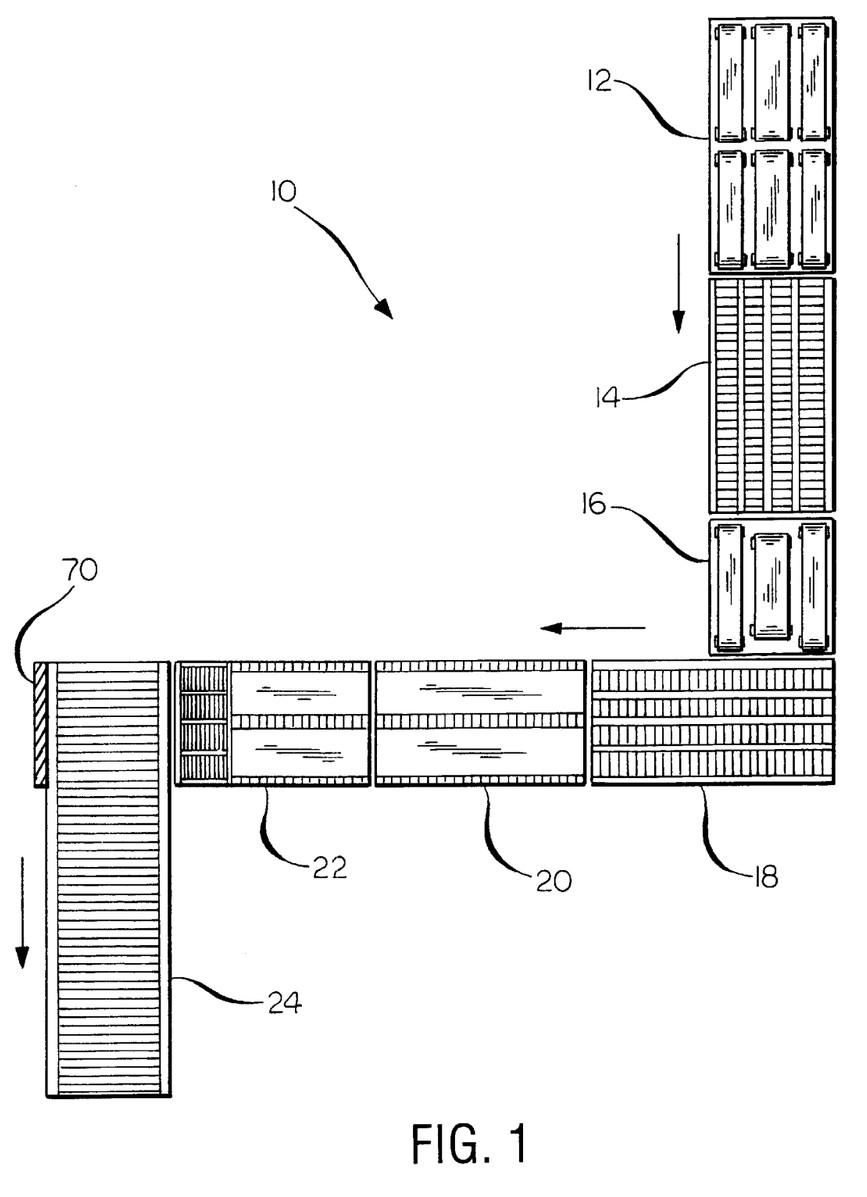
FIG. 1 shows a plan view of the shingle bundle palletizer according to the invention.
Figure 2:
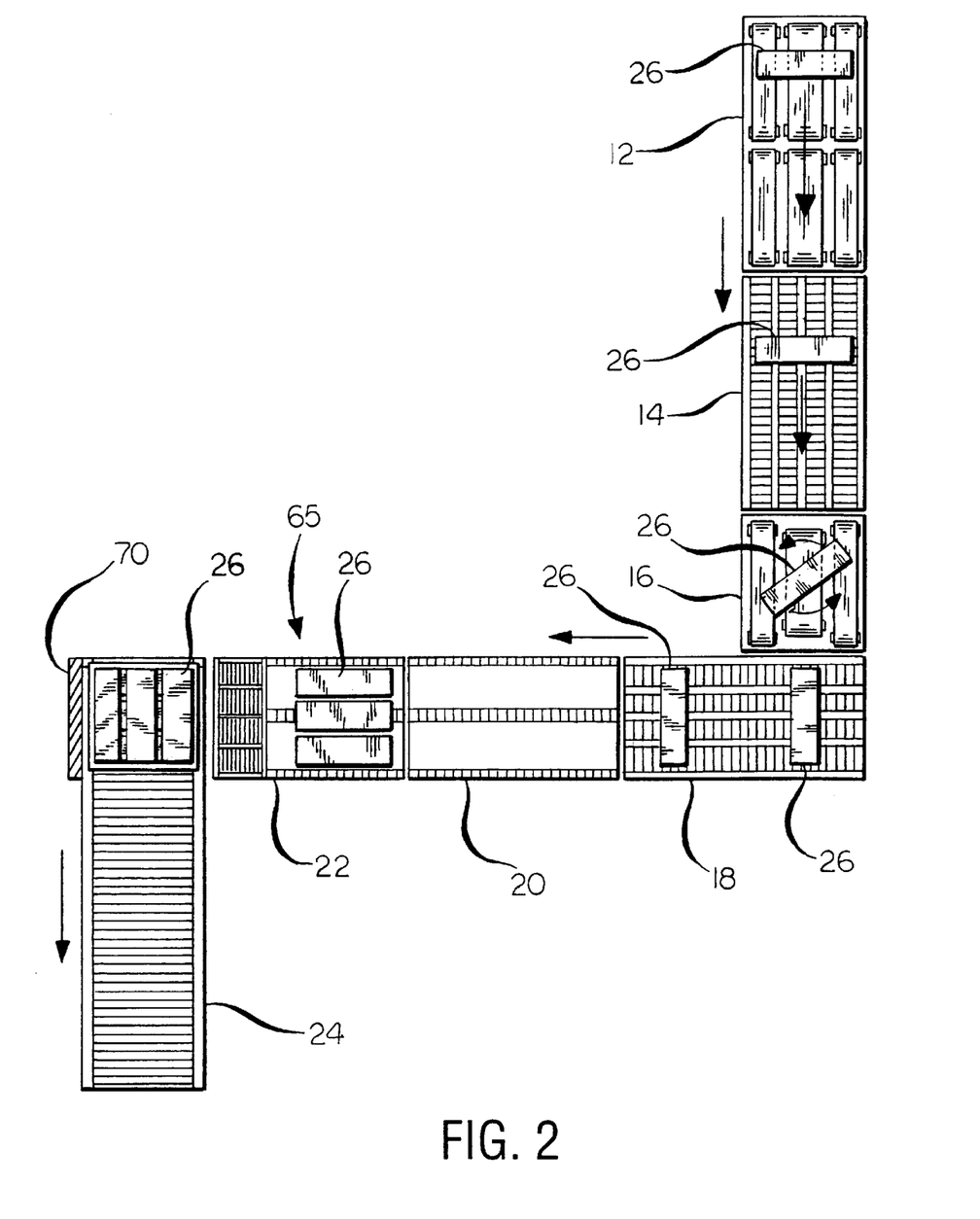
FIG. 2 shows a plan view of the shingle bundle palletizer illustrating the orientation of shingle bundles as they travel on the bundle palletizer.

There is illustrated in FIGS. 1 and 2 a shingle bundle palletizer, shown generally at 10, according to the invention. In general, the shingle bundle palletizer 10 includes a bundle metering conveyor 12, an incline conveyor 14, a pattern conveyor 16, a lug conveyor 18, an adjustable height transfer conveyor 20, a shuttle conveyor 22, and a pallet removal conveyor 24. The incline conveyor 14, the lug conveyor 18, the adjustable height transfer conveyor 20 and the pallet removal conveyor 24 are generally well known mechanisms for palletizing shingle bundles and will not be discussed in great detail herein.

Figure 3:
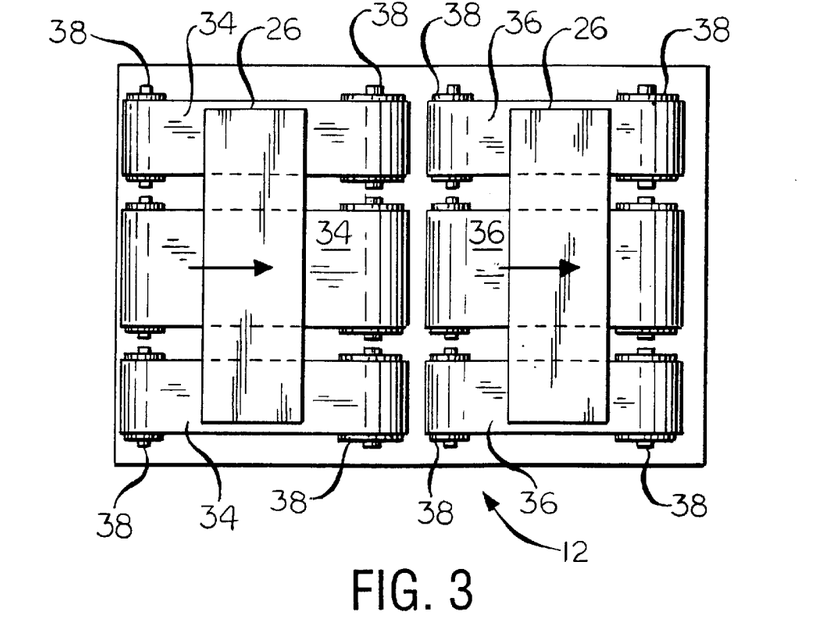
FIG. 3 shows a top plan view of the bundle metering conveyor illustrating the upstream and downstream belt configuration according to the invention.
Figure 4:
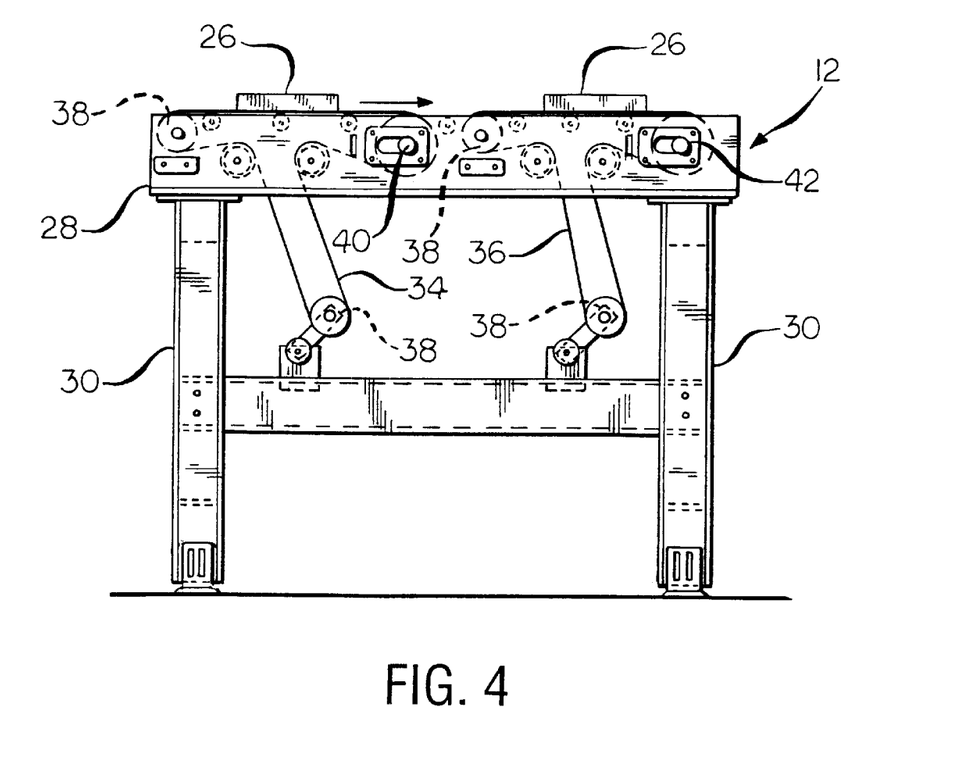
FIG. 4 shows a side elevational view of the bundle metering conveyor according to the invention.

Referring now to FIGS. 3 and 4, the bundle metering conveyor 12 feeds or supplies shingle bundles 26 to the downstream components of the bundle palletizer 10 at a desired rate and orientation. As shown in FIG. 3, the bundle metering conveyor 12 supplies the shingle bundles 26 to the bundle palletizer 10 in an East-West (E–W) orientation. For purposes of illustration, the bundles are referred to as being either in an East–West (E–W) or in a North-South (N–S) orientation, although it is to be understood that the actual orientation could be any direction.

The bundle metering conveyor 12 includes an upper frame member 28 supported by a plurality of support legs 30, which may in turn be supported by a cross member 32. The bundle metering conveyor 12 also includes one or more upstream belts 34 and one or more downstream belts 36 which are rotatably mounted on one or more rollers 38.

One aspect of the invention is that the upstream belts 34 are driven by an in-roller variable speed motor 40, and that the downstream belts 36 are driven by a different in-roller variable speed motor 42, such that the travel speed of the upstream belts 34 can be at a different travel speed than the downstream belts 36. Further, the use of the in-roller variable speed motors 40, 42 allows the travel speed of each of the belts 34, 36 to be precisely controlled so as to provide a desired feed rate and a desired take away rate of the shingle bundles 26, respectively. For example, the upstream belts 34 may run at a desired travel speed of approximately 38 ft/min to supply the shingle bundles 26 at the desired feed rate of approximately 38 bundles/min, and the downstream belts 36 may run at a desired faster travel speed of approximately 154 ft/min to provide a faster takeaway rate than the feed rate of the shingle bundles 26.

Figure 5:
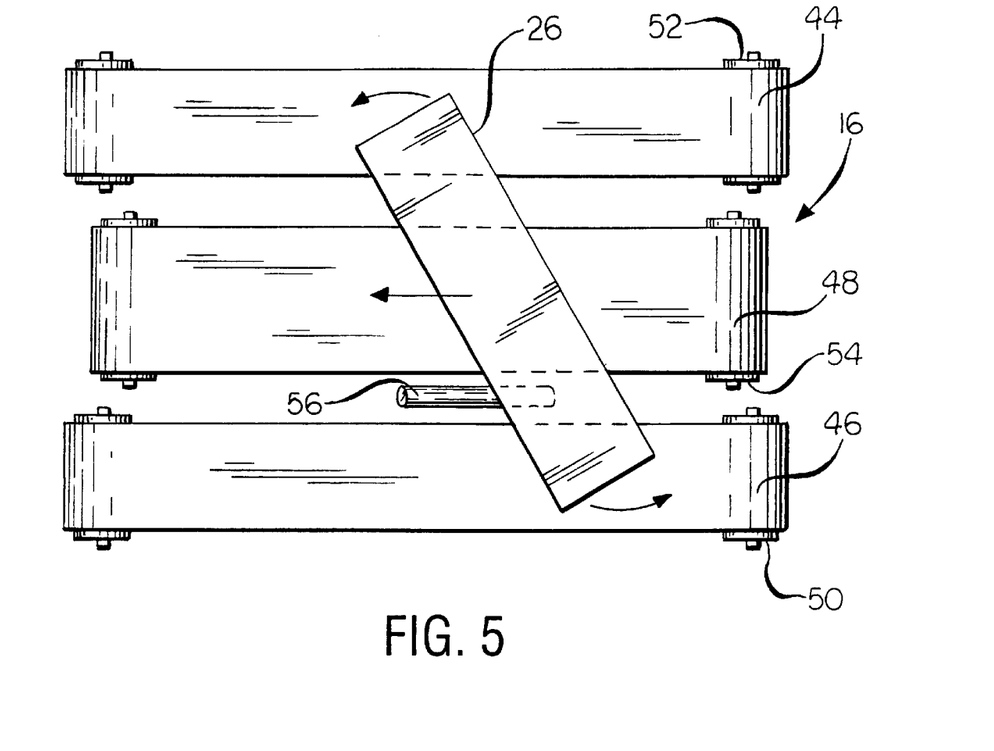
FIG. 5 shows a top plan view of the pattern conveyor rotating a shingle bundle from the East-West (E–W) orientation to the North-South (N–S) orientation as the shingle bundle travels down the bundle palletizer.
Figure 6:
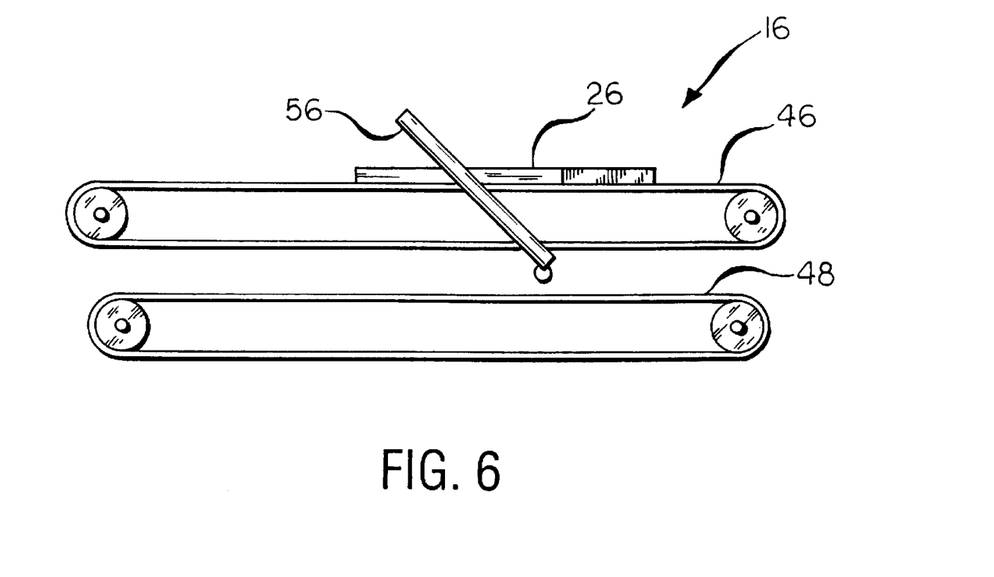
FIG. 6 shows a side elevational view of the pattern conveyor of FIG. 5 illustrating the lifter roller in the raised position to rotate the shingle bundle.
Figure 7:
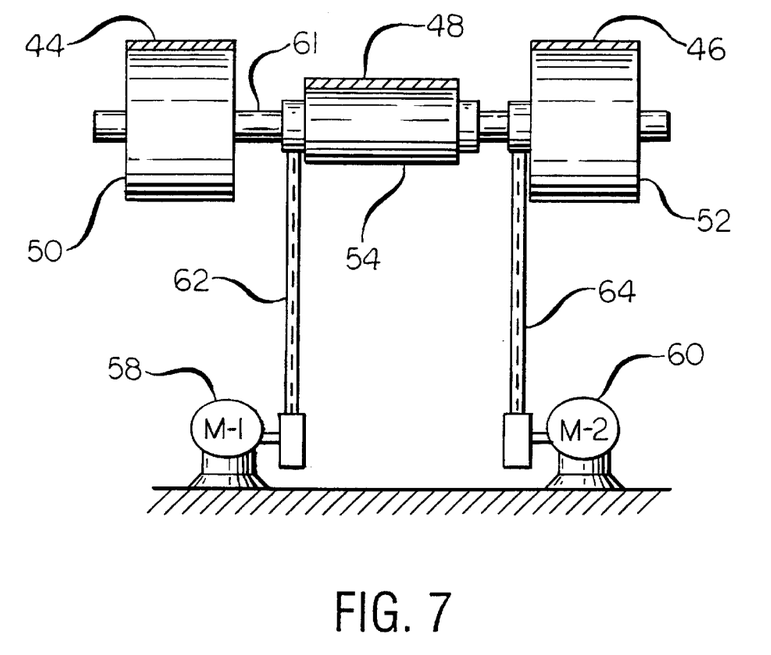
FIG. 7 shows a block diagram of the drive mechanism of the pattern conveyor illustrating a dual-motor, dual-belt configuration for precisely controlling the travel speed of the inner and outer belts.

Once the shingle bundles 26 are supplied by the bundle metering conveyor 12, they travel downstream to the pattern conveyor, as shown in FIGS. 5 through 7. The pattern conveyor 16 includes a pair of outer, upper pattern belts 44, 46 and a center, lower pattern belt 48. The outer pattern belts 44, 46 are rotatably mounted on outer pulleys 50, 52, and the lower pattern belt 48 is rotatably mounted on a center pulley 54. If the shingle bundle 26 is to remain in the East-West (E–W) orientation as deposited by the bundle metering conveyor 12, then the two upper pattern belts 44, 46 transfer the shingle bundle 26 downstream without changing the orientation of the shingle bundle 26. If the shingle bundle 26 is to be rotated to a North-South (N–S) orientation, then one end of a pivotally mounted lifter roller 56 is raised up above the plane of the upper pattern belts 44, 46 to intercept one end of the shingle bundle 26, as shown in FIG. 6. As the other end of the shingle bundle 26 continues to travel downstream, the shingle bundle 26 rotates and ends up in a N–S orientation, traveling on the lower pattern belt 48. Preferably, the lower pattern belt 48 travels faster (about 400 ft/min) than the upper belts 44, 46 (about 360 ft/min) so that the rotated N–S bundle has enough momentum to be propelled properly onto the lug conveyor 18. A layer of shingle bundles is accumulated on the lug conveyor 18 in either the N–S orientation or the E–W orientation.

The drive mechanism for the pattern conveyor 16 of the invention is shown in FIG. 7. Preferably, the pattern conveyor 16 uses two variable speed motors 58, 60, one motor for the two outer pattern belts 44, 46 and the outer pulleys 50, 52, and one motor for the center pattern belt 48 and the center pulley 54. The use of two motors 58, 60 allows the fine tuning of the rotational speed of the motor 60 driving the center pattern belt 48 independent of the rotational speed of the motor 58 driving the outer pattern belts 44, 46. In this manner, the center pattern belt 48 is decoupled from the outer belts 44, 46 to enable greater flexibility in adjusting the travel speed of the center pattern belt 48 independently of the travel speed of the outer pattern belts 44, 46. By contrast, conventional single drive mechanisms cannot adjust the travel speed of the center pattern belt independently of the outer pattern belts. The outer pulleys 50, 52 can be keyed to the pulley shaft 61 so that they turn in unison, whereas the center pulley 54 can be free-rotating about the pulley shaft 61. Preferably, the outer pulleys 50, 52 are driven by the motor 58 by using a belt 64, and the center pulley 54 is driven by the motor 60 by using a belt 62. The belts 62, 64 are preferably made of an elastomeric material rather than a metallic material such as the metal chains used in conventional pattern conveyors. The belts 62, 64 are commercially available as Part No. 14M-2100-20 from Gates Rubber Co. of Denver, Colo. The use of the belts 62, 64 made of elastomeric material greatly reduces the maintenance, wear, and replacement of the belts. This has the beneficial effect of reducing the risk of injury that is associated with the metal chains that are currently being used in conventional pattern conveyors.

Figure 8:
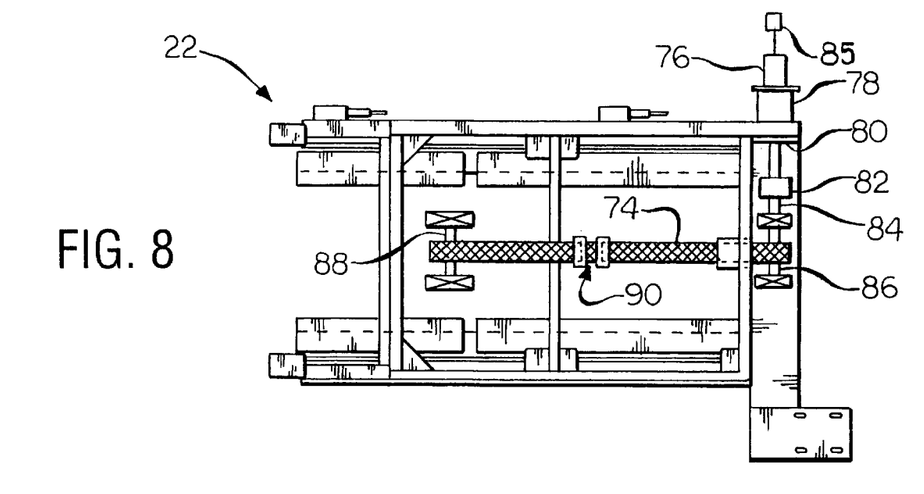
FIG. 8 shows a top plan view of the shuttle conveyor illustrating the drive mechanism for precisely controlling the reciprocation process of the shuttle conveyor.
Figure 9:
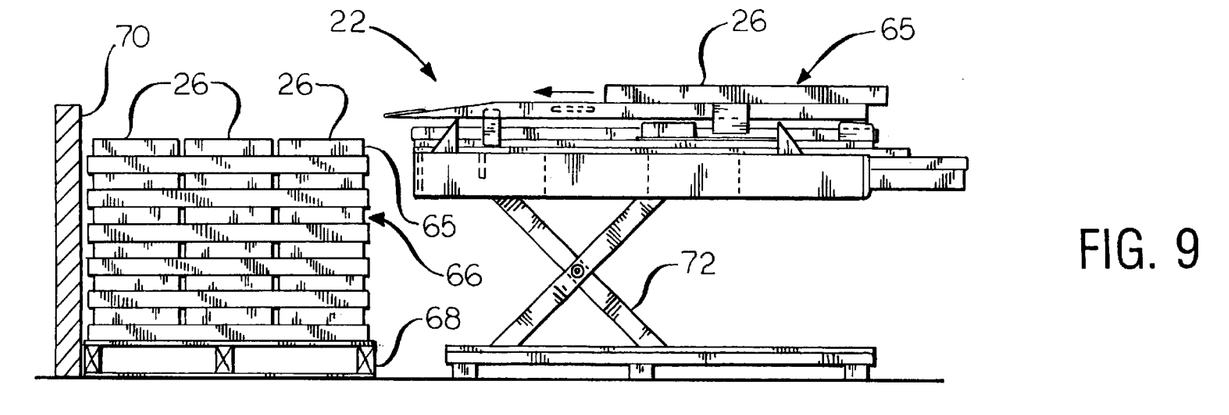
FIG. 9 shows a side elevational view of the shuttle conveyor of FIG. 8 illustrating the scissor lift, the stacking wall, and the stack of shingle bundles.
Figure 10:
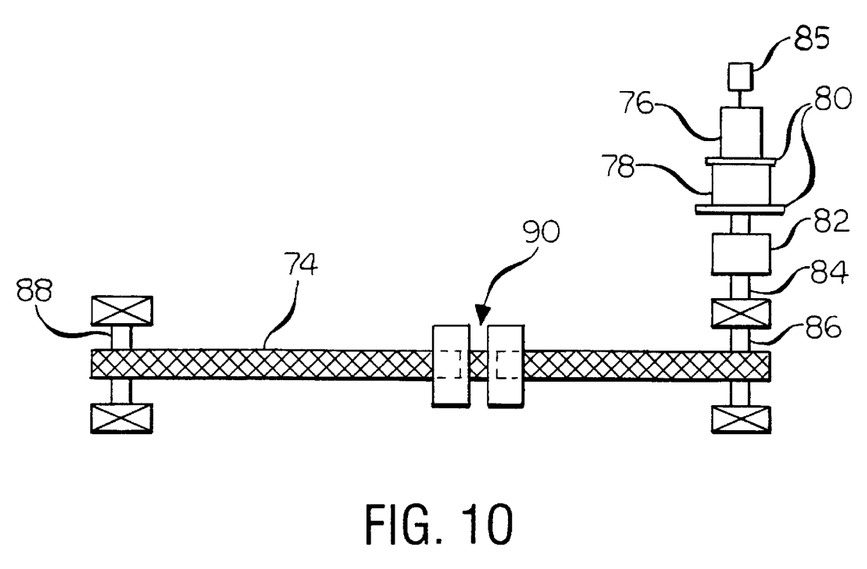
FIG. 10 shows a block diagram of the drive mechanism for the shuttle conveyor illustrating the servo motor for precisely controlling the travel speed of the belt of the shuttle conveyor.

After the bundles 26 are oriented in the proper orientation by the pattern conveyor 16, an oriented layer 65 of shingle bundles 26 is accumulated on the lug conveyor 18 in either the E–W or the N–S orientation. The layer 65 of shingle bundles 26 then proceeds downstream to the shuttle conveyor 22, which is shown in FIGS. 8 through 10. The shuttle conveyor 22 propels the layer 65 of shingle bundles 26 onto a stack 66 of shingle bundles supported by a pallet 68. The layer 65 of shingle bundles 26, typically containing three or four shingle bundles, is deposited against a stacking wall 70 which acts as a backstop for the layer of shingle bundles 26 as it is deposited onto the stack 66 of shingle bundles 26. The pallet 68 will eventually contain about ten to twelve layers of shingle bundles 26. Preferably, each layer will alternate between an East-West (E–W) and a North-South (N–S) orientation so as to provide stability to the stack 66 of shingle bundles 26. To accommodate for the increase in height of the stack 66 of shingle bundles 26 as they are deposited onto the pallet 68, the shuttle conveyor 22 is mounted on a scissor lift 72 which enables the height of the shuttle conveyor 22 to be higher than the stack 66 of shingle bundles 26 on the pallet 68. Examples of scissor lifts are well known in the art.

In order to propel the layer 65 of shingle bundles 26 onto the stack 66 of shingle bundles 26, the shuttle conveyor 22 is reciprocated forward (to the left as viewed in FIG. 9), typically on a forty-inch stroke, and then is returned rearward (to the right as viewed in FIG. 9) to receive the next layer of shingle bundles 26 from the adjustable height transfer conveyor 20. As an example, if the shingle bundles rate from the bundle metering conveyor 12 is approximately thirty-eight bundles per minute, then a new layer of shingle bundles 26 must be deposited on the stack 66 of bundles shingles 26 about every six seconds. In this example, the shuttle conveyor 22 must be capable of moving at least about twenty-five inches per second. Thus, the shuttle conveyor 22 must be able to accelerate rapidly in both the forward and rearward directions in a finely tuned manner in order to be able to consistently build a well-structured, stable stack 66 of shingle bundles 26.

To accomplish this fine tuning of the reciprocation process, the shuttle conveyor 22 of the invention uses a drive mechanism comprising a positive positioning device 74 driven by a motor 76, preferably a variable-speed servo motor. The positive positioning device 74 can be any positioning device capable of providing an indication of the position of the shuttle conveyor 22 during the reciprocation process, such as a timing belt, a chain belt, a reinforced polymer belt, a high-torque drive (HTD) belt, and the like. In the preferred embodiment, the positive positioning device 74 comprises a belt 74 made of elastomeric material that is commercially available as Part No. 14M-4410-65 from Gates Rubber Co. of Denver, Colo. The use of the belt 74 made of elastomeric material greatly reduces the maintenance, wear, and replacement of the belts, having the effect of reducing the risk of injury that is associated with the air cylinders that are currently being used in conventional shuttle conveyors. In addition, the use of the belt 74 made of elastomeric material eliminates the undesirable variability of the reciprocation process associated with the use of air cylinders in conventional shuttle conveyors.

As best seen in FIG. 10, the servo motor 76 may be coupled to a zoil gear reducer 78, which may be coupled to the motor 76 by a spacer coupling 80. An encoder 82 may be used to read markers or other indicia on the drive shaft 84, thereby enabling a motion controller 85 of a type well-known in the art to determine the rotational speed of the drive shaft 84, and hence the exact position of the shuttle conveyor 22 during the reciprocation process. With such a good indicator of position of the shuttle conveyor 22, the exact motion profile of the movement of the shuttle conveyor 22 can be programmed, thus enabling fine tuning of the reciprocation process. Each end of the belt 74 can be rotatably supported by a pair of belt sprockets 86, 88. A shuttle clamp 90 may be used to attach the belt 74 to the shuttle conveyor 22.

After the pallet 68 contains about ten to twelve layers of shingle bundles 26, the pallet 68 then travels down the pallet removal conveyor 24 for delivery to the customer.

The principle and mode of operation of this invention have been described in its preferred embodiments. However, it should be noted that this invention may be practiced otherwise than as specifically illustrated and described without departing from its scope.

What is claimed is:

1. A shingle bundle palletizer, comprising:
   a bundle metering conveyor for providing a shingle bundle at a desired rate;
   a pattern conveyor downstream of said bundle metering conveyor for orientating the shingle bundle provided by said bundle metering conveyor in a desired orientation wherein said pattern conveyor comprises a pair of outer pattern belts rotatably mounted on a pair of outer pulleys, and a center pattern belt rotatably mounted on a center pulley wherein the outer pulleys are keyed to a pulley shaft, and wherein the center pulley is free-rotating about the pulley shaft, thereby decoupling the center pattern belt from the pair of outer belts; and
   a shuttle conveyor downstream of said pattern conveyor for stacking the shingle bundle from said pattern conveyor.

2. The bundle palletizer according to claim 1, wherein said bundle metering conveyor comprises one or more upstream belts and one or more downstream belts, wherein each upstream belt is driven by a first motor, and wherein each downstream belt is driven by a second motor.

3. The bundle palletizer according to claim 2, wherein the first and second motors are in-roller variable speed motors.

4. The bundle palletizer according to claim 2, wherein the one or more downstream belts are adapted to travel at a higher speed than the one or more upstream belts.

5. A shingle bundle palletizer, comprising:
   a bundle metering conveyor for providing a shingle bundle at a desired rate;
   a pattern conveyor downstream of said bundle metering conveyor for orientating the shingle bundle provided by said bundle metering conveyor in a desired orientation wherein said pattern conveyor comprises a pair of outer pattern belts rotatably mounted on a pair of outer pulleys wherein a first motor drives the pair of outer pattern belts, and a center pattern belt rotatably mounted on a center pulley wherein a second motor drives the center pattern belt wherein the outer pulleys are keyed to a pulley shaft, and wherein the center pulley is free-rotating about the pulley shaft, thereby decoupling the center pattern belt from the pair of outer belts; and a shuttle conveyor downstream of said pattern conveyor for stacking the shingle bundle from said pattern conveyor.

6. The bundle palletizer according to claim 5, wherein said first and second motors are variable speed motors for allowing fine tuning of the speed of the center pattern belt independent of the pair of outer belts.

7. The bundle palletizer according to claim 5, further comprising a first belt driven by said first motor for driving the pair of outer pattern belts, and a second belt driven by said second motor for driving the center pattern belt.

8. The bundle palletizer according to claim 7, wherein said first and second belts are made of elastomeric material.

9. The bundle palletizer according to claim 8, wherein said pattern conveyor further comprises a lifter roller capable of intercepting one end of the shingle bundle for orienting the shingle bundle provided by said bundle metering conveyor in the desired orientation.

10. The bundle palletizer of claim 9, wherein said lifter roller is adapted to orient the shingle bundles at a 90 degree angle to the orientation supplied by said bundle metering conveyor.

11. The bundle palletizer according to claim 1, wherein said shuttle conveyor comprises a positive positioning device driven by a motor connected to a drive shaft.

12. The bundle palletizer according to claim 11, wherein the positive positioning device comprises a belt made of elastomeric material.

13. The bundle palletizer according to claim 11, wherein the motor is a variable-speed servo motor.

14. The bundle palletizer according to claim 11, further including an encoder for reading indicia on the drive shaft, thereby enabling a determination of a rotational speed of the drive shaft and a position of said shuttle conveyor.

* * * * *